(12) United States Patent
Masakawa

(10) Patent No.: US 9,863,807 B2
(45) Date of Patent: Jan. 9, 2018

(54) MACHINE TOOL WITH PROTECTIVE COVER DETECTOR

(71) Applicant: FANUC Corporation, Yamanashi (JP)

(72) Inventor: Takashi Masakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 203 days.

(21) Appl. No.: 14/972,146

(22) Filed: Dec. 17, 2015

(65) Prior Publication Data

US 2016/0178432 A1     Jun. 23, 2016

(30) Foreign Application Priority Data

Dec. 18, 2014 (JP) ................................ 2014-256216

(51) Int. Cl.
*G01J 1/42* (2006.01)
*B23Q 11/00* (2006.01)
*B23Q 11/08* (2006.01)

(52) U.S. Cl.
CPC ............ *G01J 1/42* (2013.01); *B23Q 11/0085* (2013.01); *B23Q 11/0891* (2013.01)

(58) Field of Classification Search
CPC ..... B23Q 11/0085; B23Q 11/0891; G01J 1/42
See application file for complete search history.

(56) References Cited

U.S. PATENT DOCUMENTS

| 7,476,848 B2 * | 1/2009 | Argast ................ G01D 11/245 250/221 |
| 2004/0083868 A1 * | 5/2004 | Ohmiya ................. B23Q 11/08 83/168 |

FOREIGN PATENT DOCUMENTS

| JP | 7-20236 U | 4/1995 |
| JP | 9-314437 A | 12/1997 |
| JP | 2008-158914 A | 7/2008 |
| JP | 2009-187531 A | 8/2009 |
| JP | 2010-114169 A | 5/2010 |

OTHER PUBLICATIONS

Office Action in JP Application No. 2014-256216, dated Feb. 21, 2017.

* cited by examiner

*Primary Examiner* — Francis M Legasse, Jr.
(74) *Attorney, Agent, or Firm* — Hauptman Ham, LLP

(57) ABSTRACT

A non-removable fixed protective cover, of protective covers of a machine tool, is fitted with a light-projecting unit and a light-receiving unit, while a removable fixed protective cover and a movable protective cover are each fitted with a reflector. The light-projecting unit, light-receiving unit, and reflector are disposed so that light emitted from the light-projecting unit reaches the light-receiving unit only when the removable fixed protective cover is mounted in a proper position and the movable protective cover is fully closed.

2 Claims, 3 Drawing Sheets

MACHINE TOOL WITH PROTECTIVE COVER DETECTOR

RELATED APPLICATIONS

The present application claims priority to Japanese Application Number 2014-256216, filed Dec. 18, 2014, the disclosure of which is hereby incorporated by reference herein in its entirety.

BACKGROUND OF THE INVENTION

Field of the Invention

The present invention relates to a machine tool having a function of detecting the attachment state of protective covers.

Description of the Related Art

In general, many of machine tools with CNC are configured so that a machining area is covered by protective covers to prevent chips or a cutting fluid from scattering or splashing during machining. The protective covers include "fixed protective covers" without a movable mechanism and "movable protective covers" with the movable mechanism.

A movable protective cover is provided for an operation to place a workpiece to be machined in the machining area. Further, the fixed protective covers can be classified into "non-removable fixed protective covers" and "removable fixed protective covers". The non-removable fixed protective covers are not supposed to be removed in the general use of machine tools, due to problems including their weight, mounting method, and necessity. The removable fixed protective covers can be easily removed although they are not supposed to be removed in normal use.

The movable protective cover is designed to be opened or closed after the start or completion of machining, in order to secure the workpiece in the machining area, for example. As disclosed in Japanese Patent Application Laid-Open No. 2009-187531, therefore, the open/close state of the movable protective cover is monitored for safety by a numerical controller (CNC) using a safety lock mechanism. For example, a limit is set such that an automatic operation mode cannot be started unless the movable protective cover is closed, for example. Since the safety lock mechanism is expected to forcibly maintain the closed state in view of safety, it is generally a mechanical lock mechanism.

However, the safety lock mechanism of this type is intended to monitor the open/close state of the movable protective cover only, and unlike that of the present invention described later, cannot monitor the attachment state of the fixed protective covers together. This is because the fixed protective covers are inherently fixed metal plates that surround the machine tool and are not supposed to be objects of monitoring.

Further, operations to open and close the covers are omitted in actual use. If the safety lock mechanism is modified so that the CNC may be forced to misunderstand that the covers are closed, the machine tool may sometimes be automatically operated with the covers open, resulting in a safety problem.

In some cases, the removable fixed protective covers may be temporarily removed during maintenance work for the machine tool, such as cleaning in the machining area. Unlike the movable protective cover to be opened and closed, however, the fixed protective covers generally are not designed to be mounted and removed, so that their attachment state is not monitored by the CNC in many cases. Therefore, the machine tool is allowed to be automatically operated even when the fixed protective covers are carelessly left unattached after the maintenance work or the like. In such a case, the same safety problem for the case of the movable protective cover with the modified safety lock mechanism may be caused.

If these protective covers are in abnormal positions, e.g., inclined positions, although they do not fail to be attached, moreover, a cutting fluid or chips of the workpiece may possibly splash or scatter out of the protective covers during machining or the fixed protective covers may cause an accident by dropping or the like.

As described in Japanese Patent Application Laid-Open No. 2008-158914, for example, there is a known technique for detecting the attachment state of a protective cover of a machine. In this technique, a contactor and a terminal are attached to the main body of an electronic apparatus and the cover, respectively, so that they contact each other when the cover is closed, whereby the attachment of the cover can be electrically detected.

SUMMARY OF THE INVENTION

However, the technique for detecting the attachment state of a protective cover of a machine disclosed in Japanese Patent Application Laid-Open No. 2008-158914 described above is intended to detect the respective attachment states of a cover portion that is designed to be attached and detached and a cover portion that is assumed to be integral with the electronic apparatus body and is not designed to be attached and detached. Unlike the case of the present invention described later, therefore, the attachment state of the cover portion that is not normally designed to be attached and detached is not detected together.

Accordingly, in view of the prior art problems described above, an object of the present invention is to provide a machine tool having a function of detecting the attachment states of a fixed protective cover and a movable protective cover, which are independent of each other, easily and simultaneously at low cost.

A machine tool according to the present invention includes a non-removable fixed protective cover, a removable fixed protective cover, and a movable protective cover. The non-removable fixed protective cover is fitted with at least one set of a light-projecting unit and a light-receiving unit, and the removable fixed protective cover and the movable protective cover are each fitted with at least one reflector. The light-projecting unit, the light-receiving unit, and the reflector are disposed so that a light beam emitted from the light-projecting unit is received by the corresponding light-receiving unit only when the removable fixed protective cover is mounted in an originally-proper position and the movable protective cover is fully closed, and are arranged so as to define an optical path in which the light beam emitted from the light-projecting unit reaches the corresponding light-receiving unit through the corresponding reflector.

One of the light-projecting units may be configured to emit the light beam in two or more directions toward two or more reflectors disposed in different directions so that a plurality of optical paths are formed for each light-projecting unit.

According to the present invention, there can be provided a machine tool capable of detecting the attachment states of a fixed protective cover and a movable protective cover of a machine tool, which are independent of each other, easily and simultaneously at low cost.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
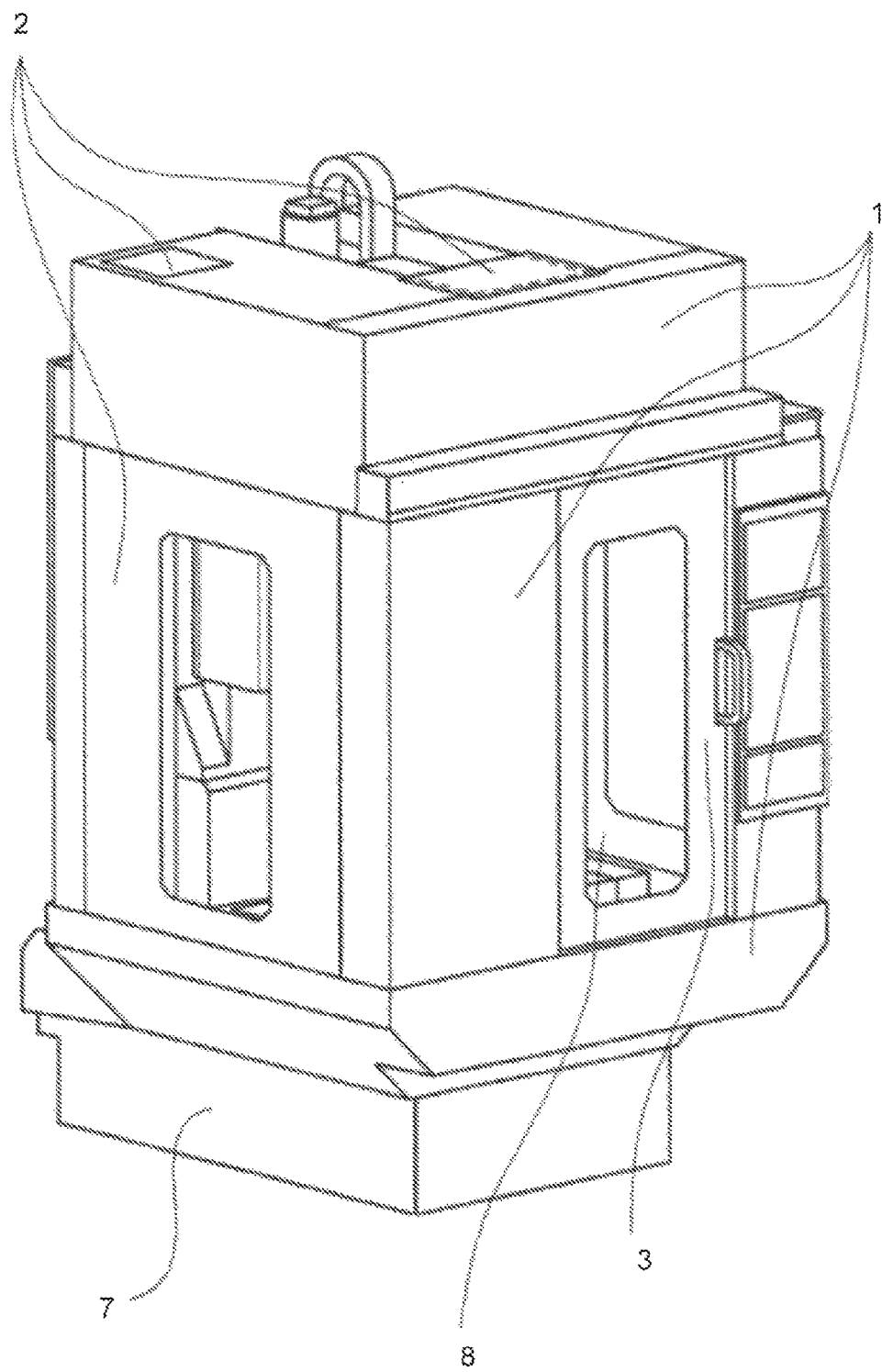
FIG. 1 is a view showing protective covers attached to a machine tool according to the present invention.
Figure 2:
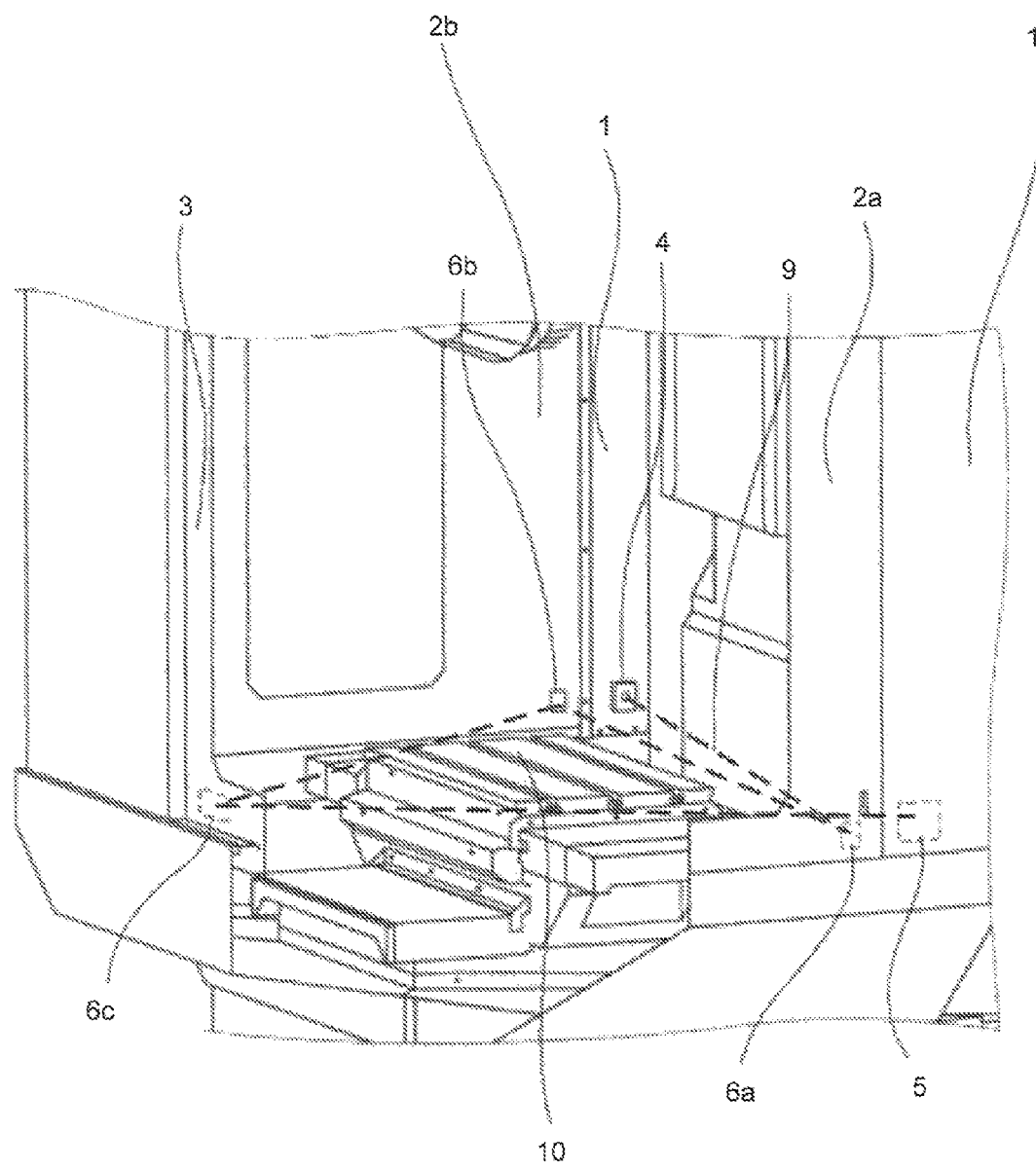
FIG. 2 is a view showing an example in which the machine tool of FIG. 1 includes two removable fixed protective covers and one set of a light projector and a light receiver.
Figure 3:
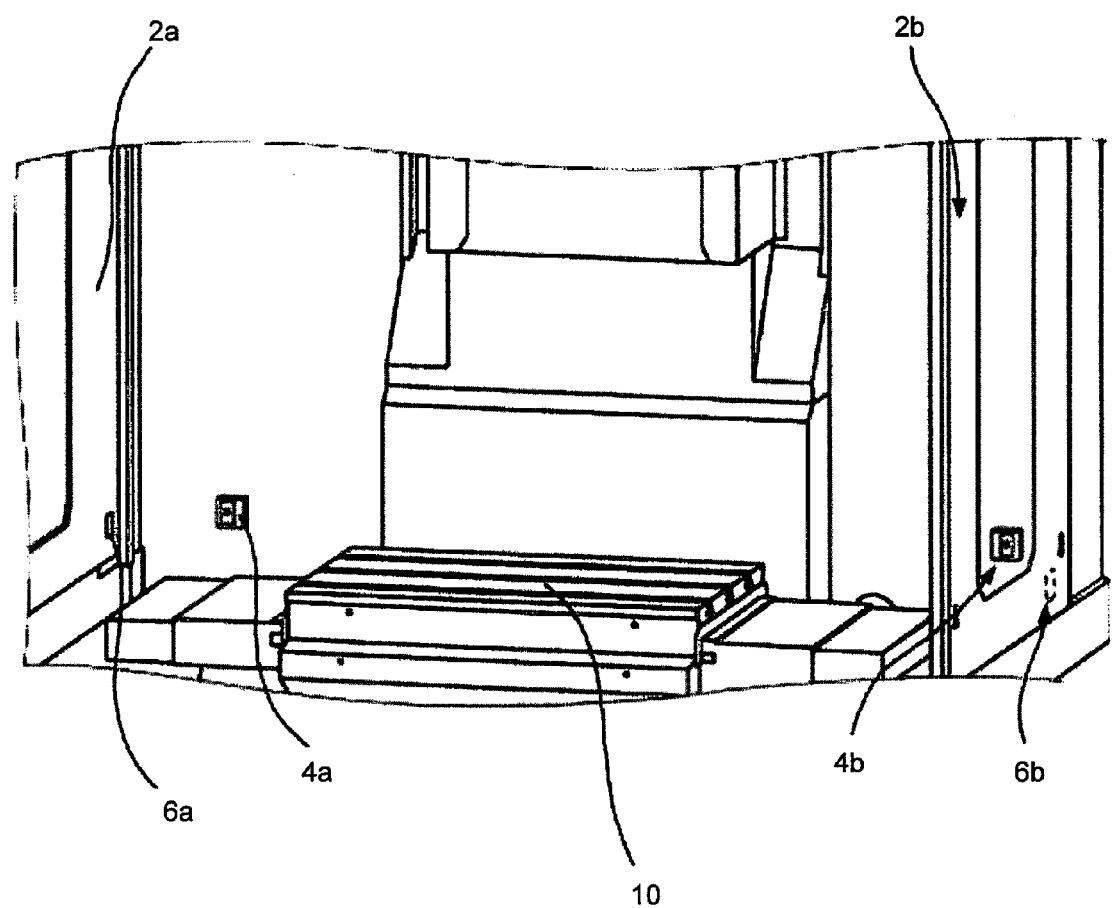
FIG. 3 is a view showing an example in which the machine tool of FIG. 1 includes two sets of light-projecting and light-receiving units.

Referring now to FIGS. 1 to 3, there will be described one embodiment of a machine tool according to the present invention, configured to simultaneously and simply detect the respective attachment states of fixed protective covers and a movable protective cover by means of an optical technology.

FIG. 1 is a view showing protective covers attached to the machine tool according to the present invention.

The machine tool serves to machine workpieces. Protective covers are disposed on a base 7 of the machine tool so as to cover the machine body lest a cutting fluid splash out of it while a workpiece (not shown) is being machined, whereby an entire machining area is cut off and blocked from the outside.

These protective covers include "fixed protective covers" without a movable mechanism and "movable protective covers" with the movable mechanism.

A movable protective cover 3 is provided for an operation to place the workpiece to be machined in the machining area. Further, the fixed protective covers can be classified into "non-removable fixed protective covers 1" and "removable fixed protective covers 2". The non-removable fixed protective covers 1 are not supposed to be removed in the general use of machine tools, due to problems including their weight, mounting method, and necessity. The removable fixed protective covers 2 can be easily removed although they are not supposed to be removed in normal use. The fixed protective covers are also called splash guards.

The movable protective cover 3 is designed to be opened or closed after the start or completion of machining, in order to secure the workpiece in the machining area, for example. The movable protective cover 3 is provided with a transparent window 8 through which an operator can perceive the machining area.

FIG. 2 is a view showing an example in which the machine tool of FIG. 1 includes two removable fixed protective covers and one set of a light projector and a light receiver. In FIG. 2, the non-removable fixed protective covers 1 shown in FIG. 1 and lateral parts of two removable fixed protective covers 2a and 2b are partially cutaway so that the machining area of the machine tool are visible.

A workpiece (not shown) to be machined, placed on a table 10, is machined by a tool (not shown).

As shown in FIG. 2, a light-projecting unit 4 and a light-receiving unit 5 are mounted inside the non-removable fixed protective covers 1 (or in the machining area). Reflectors 6a, 6b and 6c are attached to removable fixed protective covers 2a and 2b and the movable protective cover 3, respectively. It is necessary for the reflectors 6a to 6c to define together an optical path 9 that extends from the light-projecting unit 4 to the light-receiving unit 5 only when the respective mounting positions and mounting angles of the reflectors 6a to 6c satisfy the following Conditions I and II.

Condition I: The removable fixed protective covers 2a and 2b are mounted in their originally-proper positions.

Condition II: The movable protective cover 3 is fully closed.

When the above Conditions I and II are satisfied, a light beam emitted from the light-projecting unit 4 forms the optical path 9 that extends from the reflector 6a to the reflector 6b, from the reflector 6b to the reflector 6c, and from the reflector 6c to the reflector 6a.

In FIG. 2, the light-projecting unit 4, light-receiving unit 5, and reflectors 6a to 6c are secured in substantially the same height positions as the table 10. However, these height positions are not restricted and may be any positions such that the optical path 9 shown in FIG. 2 is formed when Conditions I and II are satisfied. Further, the optical path 9 from the light-projecting unit 4 to the light-receiving unit 5 is formed if the mounting postures of the protective covers 1, 2a, 2b and 3 are originally proper.

In order to construct a lower-priced device for detecting the protective covers 1, 2a, 2b and 3, it is desirable to use only one set of the light-projecting unit 4 and the light-receiving unit 5. Alternatively, however, two or more sets of the light-projecting unit 4 and the light-receiving unit 5 may be used without any problem. Alternatively, moreover, a light beam may be split in two directions from the light-projecting unit 4 as it is emitted toward the reflectors disposed in two different directions. Thus, the configuration of the detecting device for the protective covers can be simplified and the states of the protective covers can be detected in more detail.

FIG. 3 is a view showing the machine tool comprising two sets of light-projecting units 4a and 4b and a light-receiving unit (not shown). In this machine tool, the one light-projecting unit 4a defines one optical path (not shown) in conjunction with the one reflector 6a, while the other light-projecting unit 4b defines another optical path (not shown) in conjunction with the other reflector 6b.

Further, the removable fixed protective covers 2 and the movable protective cover 3 may be single or multiple in number. If these protective covers are multiple, all of them may be incorporated in one and the same optical path, or in contrast, some of the removable fixed protective covers 2 or the movable protective cover 3 need not be incorporated in the optical path. If the protective cover or covers are not incorporated in the optical path, the reflectors 6 (6a to 6c) need not be mounted.

With the above-described configuration according to the present invention, light emitted from the light-projecting unit 4 is detected in the light-receiving unit 5 by the use of the optical path formed according to the invention. Thus, correct attachment of the removable fixed protective covers 2 and full closure of the movable protective cover 3 can be confirmed easily and simultaneously.

According to the present invention, correct attachment of the removable fixed protective covers 2 and full closure of the movable protective cover 3 can be confirmed easily and simultaneously at low cost by using at least one of the sets of the light-projecting unit 4 and the light-receiving unit 5.

Further, a plurality of optical paths can be arranged between a plurality of sets of the light-projecting unit 4 and the light-receiving unit 5. Therefore, abnormal one(s) of the protective covers can be narrowed down without identifying those protective covers which do not require the confirmation of correct attachment of the removable fixed protective covers 2 and full closure of the movable protective cover 3.

Thus, an automatic operation can be prevented from being performed with the removable fixed protective covers 2 mounted in abnormal positions or having failed to be mounted. While the safety of the movable protective cover 3 should be guaranteed by a safety lock mechanism, moreover, danger due to modification of the safety lock mechanism can be reduced by further checking the protective covers of the present invention for detection.

The invention claimed is:

1. A machine tool comprising a non-removable fixed protective cover, a removable fixed protective cover, and a movable protective cover, wherein
   the non-removable fixed protective cover is fitted with at least one set of a light-projecting unit and a light-receiving unit,
   the removable fixed protective cover and the movable protective cover are each fitted with at least one reflector, and
   the light-projecting unit, the light-receiving unit, and the reflector are disposed so that a light beam emitted from the light-projecting unit is received by the corresponding light-receiving unit only when the removable fixed protective cover is mounted in an originally-proper position and the movable protective cover is fully closed, and are arranged so as to define an optical path in which the light beam emitted from the light-projecting unit reaches the corresponding light-receiving unit through the corresponding reflector.

2. The machine tool according to claim 1, wherein one of the light-projecting units emits the light beam in two or more directions toward two or more reflectors disposed in different directions so that a plurality of optical paths are formed for each light-projecting unit.

* * * * *